United States Patent
Shin et al.

(10) Patent No.: US 10,664,959 B2
(45) Date of Patent: May 26, 2020

(54) METHOD OF PERFORMING AN IMAGE-ADAPTIVE TONE MAPPING AND DISPLAY DEVICE EMPLOYING THE SAME

(71) Applicant: Samsung Display Co., Ltd., Yongin-si (KR)

(72) Inventors: Jihye Shin, Cheonan-si (KR); Seonhaeng Kim, Seoul (KR); Seungho Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/286,062

(22) Filed: Feb. 26, 2019

(65) Prior Publication Data

US 2019/0279343 A1 Sep. 12, 2019

(30) Foreign Application Priority Data

Mar. 8, 2018 (KR) .................. 10-2018-0027546

(51) Int. Cl.
*G06T 5/00* (2006.01)
*G09G 5/10* (2006.01)
*G09G 3/20* (2006.01)

(52) U.S. Cl.
CPC ............ *G06T 5/008* (2013.01); *G09G 3/20* (2013.01); *G09G 5/10* (2013.01); *G06T 2207/20004* (2013.01); *G06T 2207/20021* (2013.01); *G06T 2207/20208* (2013.01); *G09G 2320/066* (2013.01); *G09G 2320/0673* (2013.01); *G09G 2360/16* (2013.01)

(58) Field of Classification Search
CPC ............ G02F 1/133; G02F 1/133609; G02F 2001/133626; G06T 5/00; G06T 5/008; G06T 2207/20004; G06T 2207/20021; G06T 2207/20208; G09G 3/3607; G09G 2320/066; G09G 2320/0673; G09G 2360/16; G09G 3/20; G09G 5/10; H04N 1/407
See application file for complete search history.

(56) References Cited

U.S. PATENT DOCUMENTS

| | | | |
|---|---|---|---|
| 7,428,333 B2 | 9/2008 | Asari et al. | |
| 8,280,184 B2 | 10/2012 | Chen et al. | |
| 2010/0157078 A1 | 6/2010 | Atanassov et al. | |
| 2014/0092117 A1* | 4/2014 | Yoshimura | G09G 5/02 345/589 |
| 2018/0005560 A1* | 1/2018 | Itakura | G09G 3/20 |

FOREIGN PATENT DOCUMENTS

KR 101365369 3/2014

* cited by examiner

*Primary Examiner* — Nelson M Rosario
(74) *Attorney, Agent, or Firm* — H.C. Park & Associates, PLC

(57) ABSTRACT

A method of performing an image-adaptive tone-mapping for a display device including performing a first tone-mapping on an image frame by applying a first tone-mapping function to respective non-target display blocks, and performing a second tone-mapping on the image frame by applying a second tone-mapping function obtained by applying a local weighted value to the first tone-mapping function to respective target display blocks.

20 Claims, 9 Drawing Sheets

METHOD OF PERFORMING AN IMAGE-ADAPTIVE TONE MAPPING AND DISPLAY DEVICE EMPLOYING THE SAME

CROSS-REFERENCE TO RELATED APPLICATION

This application claims priority from and the benefit of Korean Patent Application No. 10-2018-0027546, filed on Mar. 8, 2018, which is hereby incorporated by reference for all purposes as if fully set forth herein.

BACKGROUND

Field

Exemplary embodiments of the invention relate generally to a display device and, more specifically, to a method of performing an image-adaptive tone mapping that improves a contrast ratio of an image frame by performing a tone mapping on the image frame and a display device that employs the method of performing the image-adaptive tone mapping.

Discussion of the Background

Recently, a display device enhances an image quality by improving a contrast ratio of an image frame by performing a tone mapping on the image frame. For example, the display device may perform the tone mapping on the image frame by converting an RGB signal corresponding to the image frame to be displayed on a display panel into an YCbCr signal, by converting the YCbCr signal into an Y'Cb'Cr' signal based on a tone mapping function (or referred to as a tone mapping curve), by converting the Y'Cb'Cr' signal into an R'G'B' signal, and by displaying the image frame based on the R'G'B' signal. Generally, the tone mapping may be classified into a global tone mapping which performs the tone mapping by applying the same tone mapping function to all pixels and a local tone mapping which performs the tone mapping by applying respective tone mapping functions to respective pixels. Here, the global tone mapping has disadvantages in that the global tone mapping cannot properly reflect characteristics of a specific region (e.g., a low-grayscale region) of the image frame because the same tone mapping function is applied to all pixels. On the other hand, the local tone mapping has disadvantages in that the local tone mapping cannot be performed in real-time because an excessively large amount of computation is required for performing the tone mapping as respective tone mapping functions are applied to respective pixels. Thus, an image-adaptive tone mapping in which the local tone mapping complements the global tone mapping has been suggested. However, a conventional image-adaptive tone mapping has disadvantages in that an implementation and a real-time processing are difficult because the conventional image-adaptive tone mapping performs the local tone mapping, which complements the global tone mapping in a complicated way.

The above information disclosed in this Background section is only for understanding of the background of the inventive concepts, and, therefore, it may contain information that does not constitute prior art.

SUMMARY

Exemplary embodiments provide a method of performing an image-adaptive tone mapping that can perform a local tone mapping which complements a global tone mapping in a simple way.

Exemplary embodiments also provide a display device by employing the method of performing the image-adaptive tone mapping that can perform an image-adaptive tone mapping in real-time while easily implementing the image-adaptive tone mapping.

Additional features of the inventive concepts will be set forth in the description which follows, and in part will be apparent from the description, or may be learned by practice of the inventive concepts.

An exemplary embodiment of the invention provides a method of performing an image-adaptive tone mapping including calculating an entire-grayscale luminance average, a low-grayscale luminance average, and a high-grayscale luminance average of an image frame to be displayed on a display panel by analyzing a data signal corresponding to the image frame; determining a first tone mapping function to be applied to the image frame based on the entire-grayscale luminance average, the low-grayscale luminance average, and the high-grayscale luminance average; dividing the display panel into a plurality of display blocks by grouping a plurality of pixels included in the display panel by location; classifying the display blocks into non-target display blocks, of which block luminance is greater than the low-grayscale luminance average, and target display blocks, of which the block luminance is less than the low-grayscale luminance average; performing a first tone mapping on the image frame by applying the first tone mapping function to each of the non-target display blocks; and performing a second tone mapping on the image frame by applying a second tone mapping function to each of the target display blocks, the second tone mapping function being obtained by applying a local weighted value to the first tone mapping function.

The first tone mapping function may be expressed by [Equation 1] below:

$$\text{OUTPUT1}=\text{GTM}(\text{INPUT}), \quad \text{[Equation 1]}$$

where GTM denotes the first tone mapping function, INPUT denotes a luminance signal which is extracted from the data signal, and OUTPUT1 denotes a first output luminance signal which is obtained by performing the first tone mapping on the luminance signal.

In exemplary embodiments, the second tone mapping function may be expressed by [Equation 2] below:

$$\text{OUTPUT2}=(1+\alpha)\times\text{GTM}(\text{INPUT}), \quad \text{[Equation 2]}$$

where GTM denotes the first tone mapping function, INPUT denotes the luminance signal which is extracted from the data signal, α denotes the local weighted value, and OUTPUT2 denotes a second output luminance signal which is obtained by performing the second tone mapping on the luminance signal.

The local weighted value may decrease within a predetermined weighted value range as a luminance ratio, which is calculated by dividing the block luminance of the each of the target display blocks by the low-grayscale luminance average, increases. In addition, the local weighted value may increase within the predetermined weighted value range as the luminance ratio decreases.

The pixels may be classified into high-grayscale luminance pixels, of which pixel luminance is greater than the entire-grayscale luminance average and low-grayscale luminance pixels, of which the pixel luminance is less than the entire-grayscale luminance average. In addition, the entire-grayscale luminance average may be calculated as an average of the pixel luminance of all of the pixels, the low-grayscale luminance average may be calculated as an average of the pixel luminance of the low-grayscale luminance pixels, and the high-grayscale luminance average may be calculated as an average of the pixel luminance of the high-grayscale luminance pixels.

The block luminance may be calculated as an average of the pixel luminance of the pixels included in each of the display blocks.

The block luminance may be calculated as a weighted average of the pixel luminance of the pixels included in each of the display blocks.

The block luminance may be determined as a minimum grayscale among grayscales corresponding to the pixel luminance of the pixels included in each of the display blocks.

Another exemplary embodiment of the invention provides a method of performing an image-adaptive tone mapping including calculating an entire-grayscale luminance average, a low-grayscale luminance average, and a high-grayscale luminance average of an image frame to be displayed on a display panel by analyzing a data signal corresponding to the image frame; determining a first tone mapping function to be applied to the image frame based on the entire-grayscale luminance average, the low-grayscale luminance average, and the high-grayscale luminance average; dividing the display panel into a plurality of display blocks by grouping a plurality of pixels included in the display panel by location; classifying the display blocks into non-target display blocks, of which block luminance is greater than a block luminance average of N adjacent display blocks, where N is an integer greater than or equal to 8, and target display blocks, of which the block luminance is less than the block luminance average; performing a first tone mapping on the image frame by applying the first tone mapping function to each of the non-target display blocks; and performing a second tone mapping on the image frame by applying a second tone mapping function to each of the target display blocks, the second tone mapping function being obtained by applying a local weighted value to the first tone mapping function.

In exemplary embodiments, the first tone mapping function may be expressed by [Equation 1] below:

$$\text{OUTPUT1}=\text{GTM}(\text{INPUT}), \quad \text{[Equation 1]}$$

where GTM denotes the first tone mapping function, INPUT denotes a luminance signal which is extracted from the data signal, and OUTPUT1 denotes a first output luminance signal which is obtained by performing the first tone mapping on the luminance signal.

In exemplary embodiments, the second tone mapping function may be expressed by [Equation 2] below:

$$\text{OUTPUT2}=(1+\alpha)\times\text{GTM}(\text{INPUT}), \quad \text{[Equation 2]}$$

where GTM denotes the first tone mapping function, INPUT denotes the luminance signal which is extracted from the data signal, α denotes the local weighted value, and OUTPUT2 denotes a second output luminance signal which is obtained by performing the second tone mapping on the luminance signal.

The local weighted value may decrease within a predetermined weighted value range as a luminance ratio which is calculated by dividing the block luminance of the each of the target display blocks by the block luminance average of the N adjacent display blocks increases. In addition, the local weighted value may increase within the predetermined weighted value range as the luminance ratio decreases.

The pixels may be classified into high-grayscale luminance pixels, of which pixel luminance is greater than the entire-grayscale luminance average and low-grayscale luminance pixels, of which the pixel luminance is less than the entire-grayscale luminance average. In addition, the entire-grayscale luminance average may be calculated as an average of the pixel luminance of all of the pixels, the low-grayscale luminance average may be calculated as an average of the pixel luminance of the low-grayscale luminance pixels, and the high-grayscale luminance average may be calculated as an average of the pixel luminance of the high-grayscale luminance pixels.

The block luminance may be calculated as an average of the pixel luminance of the pixels included in each of the display blocks.

The block luminance may be calculated as a weighted average of the pixel luminance of the pixels included in each of the display blocks.

The block luminance may be determined as a minimum grayscale among grayscales corresponding to the pixel luminance of the pixels included in each of the display blocks.

Another exemplary embodiment of the invention provides a display device including a display panel including a plurality of pixels, and a display panel driving circuit configured to drive the display panel. The display panel driving circuit calculates an entire-grayscale luminance average, a low-grayscale luminance average, and a high-grayscale luminance average of an image frame to be displayed on the display panel by analyzing a data signal corresponding to the image frame, determines a first tone mapping function to be applied to the image frame based on the entire-grayscale luminance average, the low-grayscale luminance average, and the high-grayscale luminance average, divides the display panel into a plurality of display blocks by grouping the pixels by location, classifies the display blocks into non-target display blocks and target display blocks based on block luminance of each of the display blocks, performs a first tone mapping on the image frame by applying the first tone mapping function to each of the non-target display blocks, and performs a second tone mapping on the image frame by applying a second tone mapping function to each of the target display blocks, the second tone mapping function being obtained by applying a local weighted value to the first tone mapping function.

The display panel driving circuit may classify the display blocks into the non-target display blocks, of which the block luminance is greater than the low-grayscale luminance average and the target display blocks, of which the block luminance is less than the low-grayscale luminance average.

The display panel driving circuit may classify the display blocks into the non-target display blocks, of which the block luminance is greater than a block luminance average of N adjacent display blocks, where N is an integer greater than or equal to 8, and the target display blocks, of which the block luminance is less than the block luminance average.

The first tone mapping function may be expressed by [Equation 1] below:

$$\text{OUTPUT1}=\text{GTM}(\text{INPUT}), \quad \text{[Equation 1]}$$

where GTM denotes the first tone mapping function, INPUT denotes a luminance signal which is extracted from the data signal, and OUTPUT1 denotes a first output luminance signal which is obtained by performing the first tone mapping on the luminance signal.

In exemplary embodiments, the second tone mapping function may be expressed by [Equation 2] below:

$$\text{OUTPUT2}=(1+\alpha)\times\text{GTM}(\text{INPUT}), \quad \text{[Equation 2]}$$

where GTM denotes the first tone mapping function, INPUT denotes the luminance signal which is extracted from the data signal, α denotes the local weighted value, and OUTPUT2 denotes a second output luminance signal which is obtained by performing the second tone mapping on the luminance signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
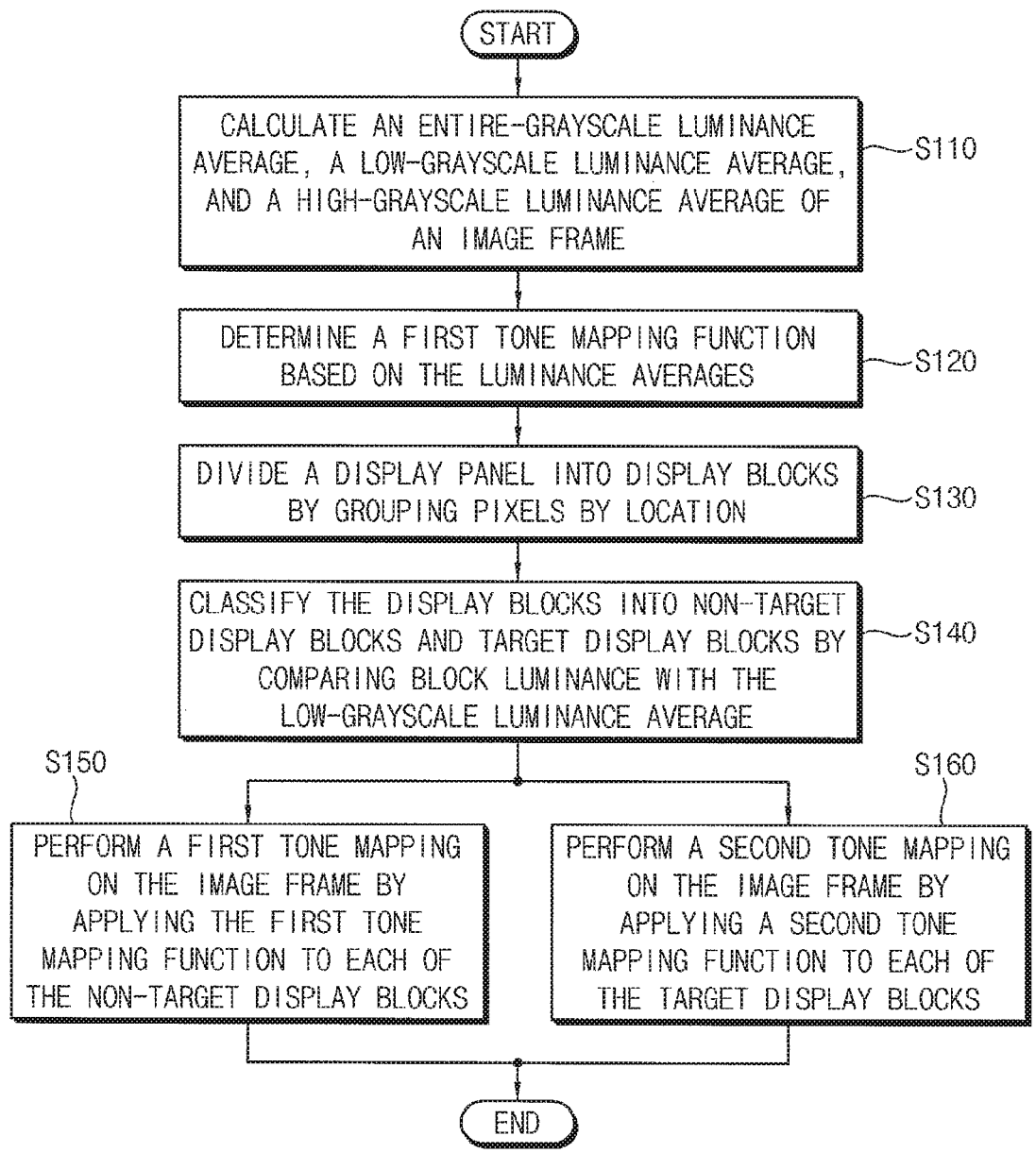
FIG. 1 is a flowchart illustrating a method of performing an image-adaptive tone mapping according to exemplary embodiments.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
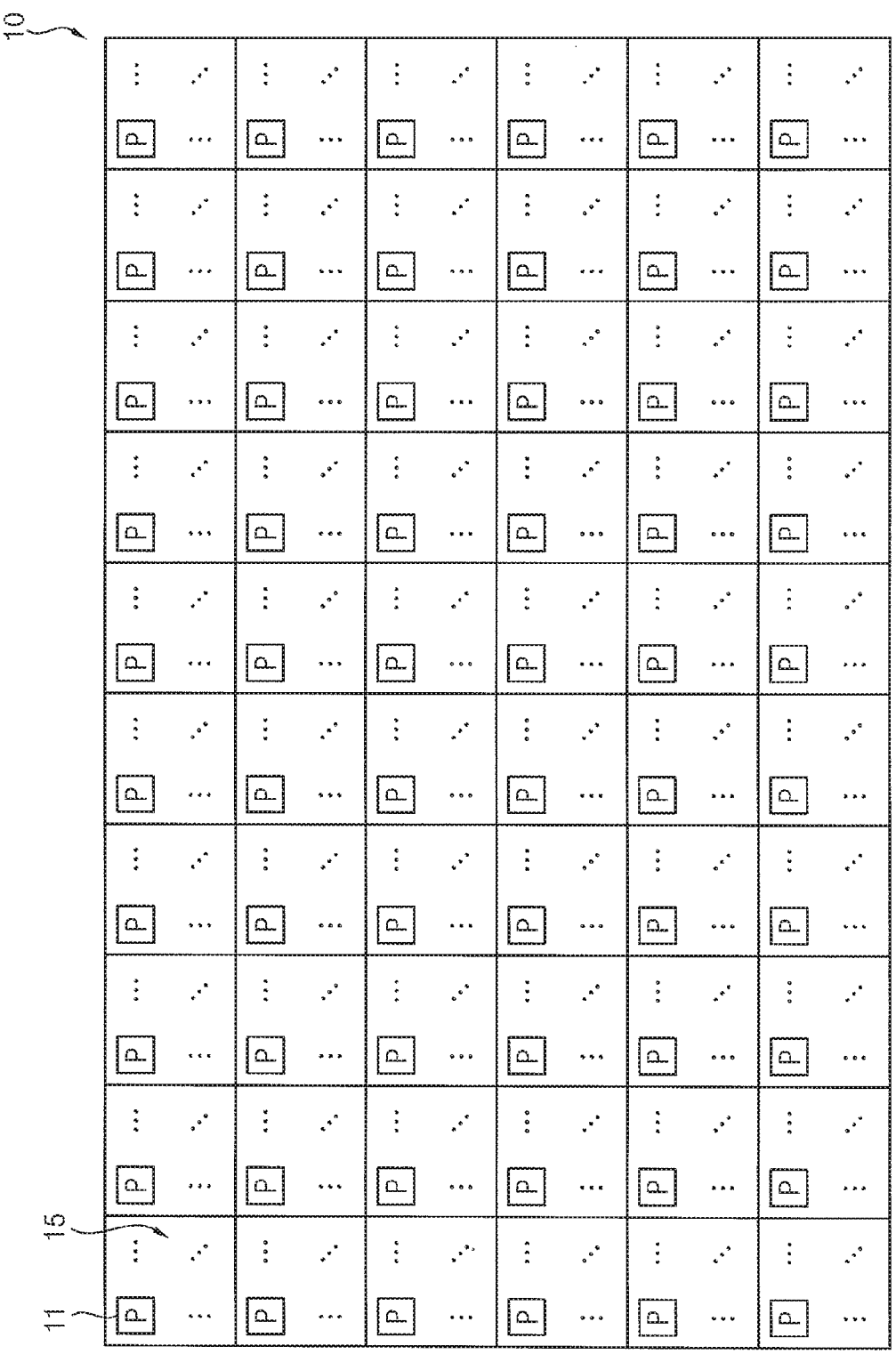
FIG. 2 is a diagram for describing the method of FIG. 1.
Figure 3A:
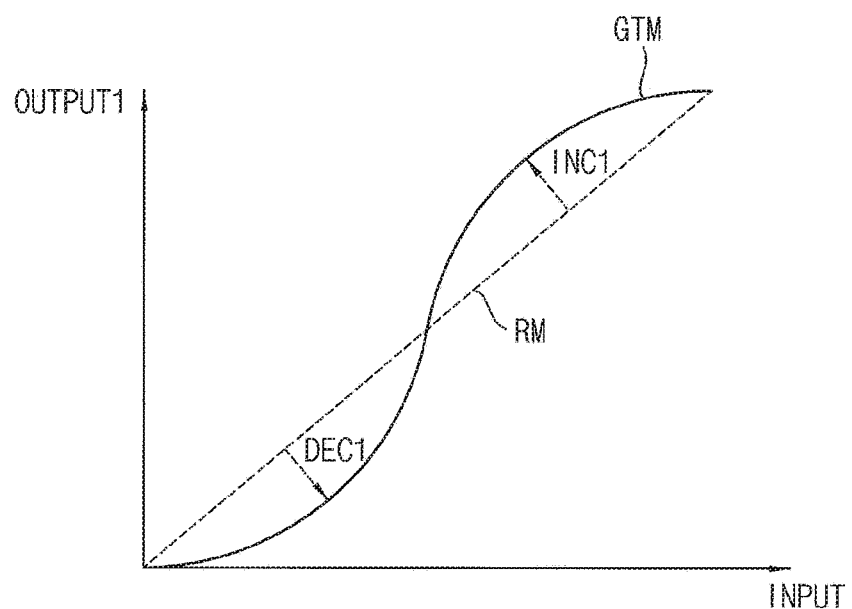
FIG. 3A is a graph illustrating an example of a first tone mapping function which is calculated by the method of FIG. 1.
Figure 3B:
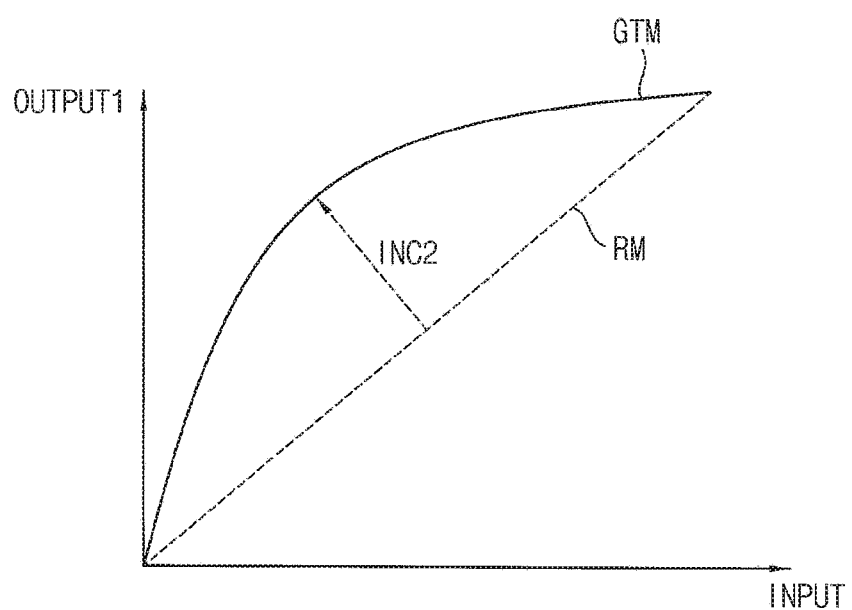
FIG. 3B is a graph illustrating another example of a first tone mapping function which is calculated by the method of FIG. 1.
Figure 4:
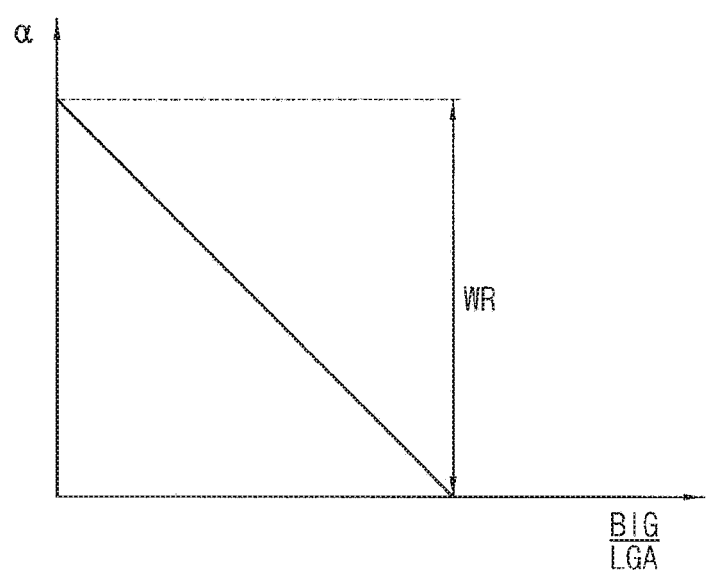
FIG. 4 is a graph illustrating a local weighted value which is calculated by the method of FIG. 1.

FIG. 1 is a flowchart illustrating a method of performing an image-adaptive tone mapping according to exemplary embodiments. FIG. 2 is a diagram for describing the method of FIG. 1. FIG. 3A is a graph illustrating an example of a first tone mapping function which is calculated by the method of FIG. 1. FIG. 3B is a graph illustrating another example of a first tone mapping function which is calculated by the method of FIG. 1. FIG. 4 is a graph illustrating a local weighted value which is calculated by the method of FIG. 1.

Referring to FIGS. 1 to 4, the method of FIG. 1 calculates an entire-grayscale luminance average, a low-grayscale luminance average LGA, and a high-grayscale luminance average of an image frame to be displayed on a display panel 10 by analyzing a data signal corresponding to the image frame (S110); determines a first tone mapping function GTM to be applied to the image frame based on the entire-grayscale luminance average, the low-grayscale luminance average LGA, and the high-grayscale luminance average of the image frame (S120); divides (or classifies) the display panel 10 into a plurality of display blocks 15 by grouping a plurality of pixels 11 included in the display panel 10 by location (S130); classifies the display blocks 15 into non-target display blocks, of which block luminance BIG (i.e., luminance which each display block 15 is to implement in the image frame) is greater than the low-grayscale luminance average LGA of the image frame, and target display blocks, of which the block luminance BIG is less than the low-grayscale luminance average LGA of the image frame (S140); performs a first tone mapping on the image frame by applying the first tone mapping function GTM to each of the non-target display blocks (S150); and performs a second tone mapping on the image frame by applying a second tone mapping function $(1+\alpha) \times GTM$ to each of the target display blocks (S160), where the second tone mapping function $(1+\alpha) \times GTM$ is obtained by applying a local weighted value $\alpha$ to the first tone mapping function GTM. The method of FIG. 1 may perform the steps S110, S120, S130, S140, S150, and S160 for respective image frames to be displayed on the display panel 10.

Specifically, the method of FIG. 1 may calculate the entire-grayscale luminance average, the low-grayscale luminance average LGA, and the high-grayscale luminance average of the image frame by analyzing the data signal corresponding to the image frame to be displayed on the display panel 10 (S110). In an exemplary embodiment, the data signal corresponding to the image frame to be displayed on the display panel 10 may be an RGB signal. In this case, the method of FIG. 1 may calculate the entire-grayscale luminance average, the low-grayscale luminance average LGA, and the high-grayscale luminance average of the image frame based on a luminance signal, which is extracted from the data signal. Specifically, the method of FIG. 1 may convert the data signal (i.e., the RGB signal) corresponding to the image frame to be displayed on the display panel 10 into an YCbCr signal and may calculate the entire-grayscale luminance average, the low-grayscale luminance average LGA, and the high-grayscale luminance average of the image frame based on the luminance signal (i.e., a Y signal) of the YCbCr signal. In an exemplary embodiment, the method of FIG. 1 may calculate the entire-grayscale luminance average of the image frame as an average of pixel luminance (i.e., luminance which each pixel 11 is to implement in the image frame) of all pixels 11 included in the display panel 10. Here, the method of FIG. 1 may classify the pixels 11 included in the display panel 10 into high-grayscale luminance pixels, of which the pixel luminance is greater than the entire-grayscale luminance average of the image frame and low-grayscale luminance pixels, of which the pixel luminance is less than the entire-grayscale luminance average of the image frame. In an exemplary embodiment, the method of FIG. 1 may determine the pixels 11, of which the pixel luminance is equal to the entire-grayscale luminance average of the image frame as the high-grayscale luminance pixels or the low-grayscale luminance pixels according to given requirements. In an exemplary embodiment, the method of FIG. 1 may calculate the low-grayscale luminance average LGA of the image frame as an average of the pixel luminance of the low-grayscale luminance pixels among the pixels 11 included in the display panel 10 and may calculate the high-grayscale luminance average of the image frame as an average of the pixel luminance of the high-grayscale luminance pixels among the pixels 11 included in the display panel 10.

Subsequently, the method of FIG. 1 may determine the first tone mapping function GTM to be applied to the image frame based on the entire-grayscale luminance average, the low-grayscale luminance average LGA, and the high-grayscale luminance average of the image frame (S120). For example, as illustrated in FIGS. 3A and 3B, the method of FIG. 1 may derive the first tone mapping curve GTM using (or with respect to) a reference function RM. Here, the reference function denotes a function when the tone mapping is not performed. As described above, the method of FIG. 1 may calculate the entire-grayscale luminance average, the low-grayscale luminance average LGA, and the high-grayscale luminance average of the image frame based on the luminance signal (i.e., the Y signal) which is extracted from the data signal (i.e., the RGB signal) corresponding to the image frame to be displayed on the display panel 10. Specifically, the method of FIG. 1 may convert the data signal (i.e., the RGB signal) corresponding to the image frame to be displayed on the display panel 10 into the YCbCr signal and may calculate the entire-grayscale luminance average, the low-grayscale luminance average LGA, and the high-grayscale luminance average of the image frame based on the luminance signal (i.e., the Y signal) of the YCbCr signal. In this case, the method of FIG. 1 may determine the first tone mapping function GTM to be applied to the image frame based on the entire-grayscale luminance average, the low-grayscale luminance average LGA, and the high-grayscale luminance average of the image frame. For example, as illustrated in FIG. 3A, when a median value between predetermined maximum luminance and the entire-grayscale luminance average of the image frame is greater than the high-grayscale luminance average of the image frame, the method of FIG. 1 may derive the first tone mapping curve GTM by moving the first tone mapping curve GTM upwardly over the reference function RM in a high-grayscale section (i.e., indicated by INC1). In addition, when a median value between predetermined minimum luminance and the entire-grayscale luminance average of the image frame is less than the low-grayscale luminance average LGA of the image frame, the method of FIG. 1 may derive the first tone mapping curve GTM by moving the first tone mapping curve GTM downwardly under the reference function RM in a low-grayscale section (i.e., indicated by DEC1). For example, as illustrated in FIG. 3B, when the median value between the predetermined maximum luminance and the entire-grayscale luminance average of the image frame is greater than the high-grayscale luminance average of the image frame and when the median value between the predetermined minimum luminance and the entire-grayscale luminance average of the image frame is greater than the low-grayscale luminance average LGA of the image frame, the method of FIG. 1 may derive the first tone mapping curve GTM by moving the first tone mapping curve GTM upwardly over the reference function RM in an entire-grayscale section (i.e., indicated by INC2). However, deriving the first tone mapping curve GTM is not limited thereto.

The method of FIG. 1 may divide the display panel 10 into the display blocks 15 by grouping the pixels 11 included in the display panel 10 by location (S130). Thus, as illustrated in FIG. 2, the display panel 10 may include one or more display blocks 15, and each of the display blocks 15 may include one or more pixels 11. For convenience of description, although it is described above that the step S130 is performed after the steps S110 and S120, it should be understood that the step S130 can be performed prior to the steps S110 and S120. In an exemplary embodiment, a size and a shape of the display block 15 formed by grouping the pixels 11 of the display panel 10 by location may be fixed. In this case, the method of FIG. 1 may divide the display panel 10 into the display blocks 15 in the same size and in the same shape for respective image frames. In another exemplary embodiment, the size and/or the shape of the display block 15 formed by grouping the pixels 11 of the display panel 10 by location may be changed. In this case, the method of FIG. 1 may divide the display panel 10 into the display blocks 15 in a different size and/or in a different shape for respective image frames or according to given requirements. When the display panel 10 is divided into the display blocks 15, the method of FIG. 1 may calculate the block luminance BIG of each display block 15. In an exemplary embodiment, the method of FIG. 1 may calculate the block luminance BIG of each display block 15 as an average of the pixel luminance of the pixels 11 included in each display block 15. In another exemplary embodiment, the method of FIG. 1 may calculate the block luminance BIG of each display block 15 as a weighted average of the pixel luminance of the pixels 11 included in each display block 15. In still another exemplary embodiment, the method of FIG. 1 may determine the block luminance BIG of each display block 15 as a minimum grayscale among grayscales corresponding to the pixel luminance of the pixels 11 included in each display block 15.

Next, the method of FIG. 1 may classify the display blocks 15 into the non-target display blocks, of which the block luminance BIG is greater than the low-grayscale luminance average LGA of the image frame and the target display blocks, of which the block luminance BIG is less than the low-grayscale luminance average LGA of the image frame (S140). In other words, the display blocks 15, of which the block luminance BIG is greater than the low-grayscale luminance average LGA of the image frame may be determined as the non-target display blocks, and the display blocks 15, of which the block luminance BIG is less than the low-grayscale luminance average LGA of the image frame may be determined as the target display blocks. In an exemplary embodiment, the method of FIG. 1 may determine the display blocks 15, of which the block luminance BIG is equal to the low-grayscale luminance average LGA of the image frame as the target display blocks or the non-target display blocks according to given requirements. Subsequently, the method of FIG. 1 may perform the first tone mapping on the image frame by applying the first tone mapping function GTM to each of the non-target display blocks among the display blocks 15 (S150) and may perform the second tone mapping on the image frame by applying the second tone mapping function $(1+\alpha) \times$GTM to each of the target display blocks among the display blocks 15 (S160), where the second tone mapping function $(1+\alpha) \times$GTM is obtained by applying the local weighted value $\alpha$ to the first tone mapping function GTM. In an exemplary embodiment, the first tone mapping function GTM may be expressed by [Equation 1] below, and the second tone mapping function $(1+\alpha) \times$GTM may be expressed by [Equation 2] below:

$$\text{OUTPUT1} = \text{GTM(INPUT)}, \qquad \text{[Equation 1]}$$

where GTM denotes the first tone mapping function, INPUT denotes the luminance signal which is extracted from the data signal, and OUTPUT1 denotes a first output luminance signal which is obtained by performing the first tone mapping on the luminance signal.

$$\text{OUTPUT2} = (1+\alpha) \times \text{GTM(INPUT)}, \qquad \text{[Equation 2]}$$

where GTM denotes the first tone mapping function, INPUT denotes the luminance signal which is extracted from the data signal, $\alpha$ denotes the local weighted value, and OUTPUT2 denotes a second output luminance signal which is obtained by performing the second tone mapping on the luminance signal.

As described above, for the pixels 11 included in the non-target display blocks among the display blocks 15, the method of FIG. 1 may perform only a so-called global tone mapping. On the other hand, for the pixels 11 included in the target display blocks among the display blocks 15, the method of FIG. 1 may perform the global tone mapping and as well as a so-called local tone mapping to complement the global tone mapping. Specifically, as illustrated in FIGS. 3A and 3B, for each of the non-target display blocks among the display blocks 15, the method of FIG. 1 may perform the first tone mapping on the image frame by outputting the first output luminance signal OUTPUT1 which is obtained by performing the first tone mapping on the luminance signal INPUT, which is extracted from the data signal, using the first tone mapping function GTM. In an exemplary embodiment, the method of FIG. 1 may convert the data signal (i.e., the RGB signal) into the YCbCr signal and may calculate the entire-grayscale luminance average, the low-grayscale luminance average LGA, and the high-grayscale luminance average of the image frame based on the luminance signal INPUT (i.e., the Y signal) of the YCbCr signal. In this case, for each of the non-target display blocks among the display blocks 15, the method of FIG. 1 may generate the first output luminance signal OUTPUT1 (i.e., the Y' signal) based on the luminance signal INPUT (i.e., the Y signal) using the first tone mapping function GTM. Thus, the YCbCr signal may be converted into the Y'Cb'Cr' signal. Subsequently, for each of the non-target display blocks among the display blocks 15, the method of FIG. 1 may convert the Y'Cb'Cr' signal into the R'G'B' signal and then may display the image frame based on the R'G'B' signal. In this way, the method of FIG. 1 may perform the first tone mapping on the image frame for each of the non-target display blocks among the display blocks 15.

On the other hand, for each of the target display blocks among the display blocks 15, the method of FIG. 1 may perform the second tone mapping on the image frame by outputting the second output luminance signal OUTPUT2 which is obtained by performing the second tone mapping on the luminance signal INPUT, which is extracted from the data signal, using the second tone mapping function $(1+\alpha) \times$ GTM. In an exemplary embodiment, the method of FIG. 1 may convert the data signal (i.e., the RGB signal) into the YCbCr signal and may calculate the entire-grayscale luminance average, the low-grayscale luminance average LGA, and the high-grayscale luminance average of the image frame based on the luminance signal INPUT (i.e., the Y signal) of the YCbCr signal. In this case, for each of the target display blocks among the display blocks 15, the method of FIG. 1 may generate the second output luminance signal OUTPUT2 (i.e., the Y' signal) based on the luminance signal INPUT (i.e., the Y signal) using the second tone mapping function $(1+\alpha) \times$ GTM. Thus, the YCbCr signal may be converted into the Y'Cb'Cr' signal. Subsequently, for each of the target display blocks among the display blocks 15, the method of FIG. 1 may convert the Y'Cb'Cr' signal into the R'G'B' signal and then may display the image frame based on the R'G'B' signal. In this way, the method of FIG. 1 may perform the second tone mapping on the image frame for each of the target display blocks among the display blocks 15. Here, as illustrated in FIG. 4, the local weighted value $\alpha$, which is applied to the first tone mapping function GTM to generate the second tone mapping function $(1+\alpha) \times$ GTM, may decrease within a predetermined weighted value range WR as a luminance ratio which is calculated by dividing the block luminance BIG of each target display block by the low-grayscale luminance average LGA of the image frame increases. On the other hand, the local weighted value $\alpha$, which is applied to the first tone mapping function GTM to generate the second tone mapping function $(1+\alpha) \times$ GTM, may increase within the predetermined weighted value range WR as the luminance ratio which is calculated by dividing the block luminance BIG of each target display block by the low-grayscale luminance average LGA of the image frame decreases. As described above, for each of the target display blocks among the display blocks 15, the method of FIG. 1 may further perform the simple local tone mapping to complement the global tone mapping by performing the second tone mapping on the image frame using the second tone mapping function $(1+\alpha) \times$ GTM, which is obtained by applying the local weighted value $\alpha$ to the first tone mapping function GTM. Therefore, as compared to a conventional image-adaptive tone mapping method, the method of FIG. 1 may be easily implemented by hardware and may be performed in real-time because an amount of computation is relatively small.

In brief, the method of FIG. 1 calculates the entire-grayscale luminance average, the low-grayscale luminance average LGA, and the high-grayscale luminance average of the image frame by analyzing the data signal corresponding to the image frame to be displayed on the display panel 10, determines the first tone mapping function GTM to be applied to the image frame based on the entire-grayscale luminance average, the low-grayscale luminance average LGA, and the high-grayscale luminance average of the image frame, divides the display panel 10 into the display blocks 15 by grouping the pixels 11 included in the display panel 10 by location, classifies the display blocks 15 into the non-target display blocks and the target display blocks based on the block luminance BIG of respective display blocks 15, performs the first tone mapping on the image frame by applying the first tone mapping function GTM to each of the non-target display blocks among the display blocks 15, and performs the second tone mapping on the image frame by applying the second tone mapping function $(1+\alpha) \times$ GTM to each of the target display blocks among the display blocks 15, where the second tone mapping function $(1+\alpha) \times$ GTM is obtained by applying the local weighted value $\alpha$ to the first tone mapping function GTM. Thus, the method of FIG. 1 may improve a contrast ratio of the image frame, may enhance expressive power of the low-grayscale region of the image frame (i.e., may properly reflect characteristics of the low-grayscale region of the image frame), and thus, may provide a high-quality image to a user. As described above, the method of FIG. 1 may improve a result (i.e., may output the second output luminance signal OUPUT2 instead of the first output luminance signal OUTPUT1 in response to the luminance signal INPUT) by applying the local weighted value $\alpha$ to the first tone mapping function GTM (i.e., the global tone mapping function) when the block luminance BIG of the display block 15 is less than the low-grayscale luminance average LGA of the image frame (i.e., the luminance of the low-grayscale region of the image frame). In other words, the method of FIG. 1 may reflect the block luminance BIG of the display block 15 (i.e., average luminance information of the display block 15) to perform the image-adaptive tone mapping. As a result, the method of FIG. 1 may enhance the expressive power of the low-grayscale region of the image frame, as well as improve the contrast ratio of the image frame.

Figure 5:
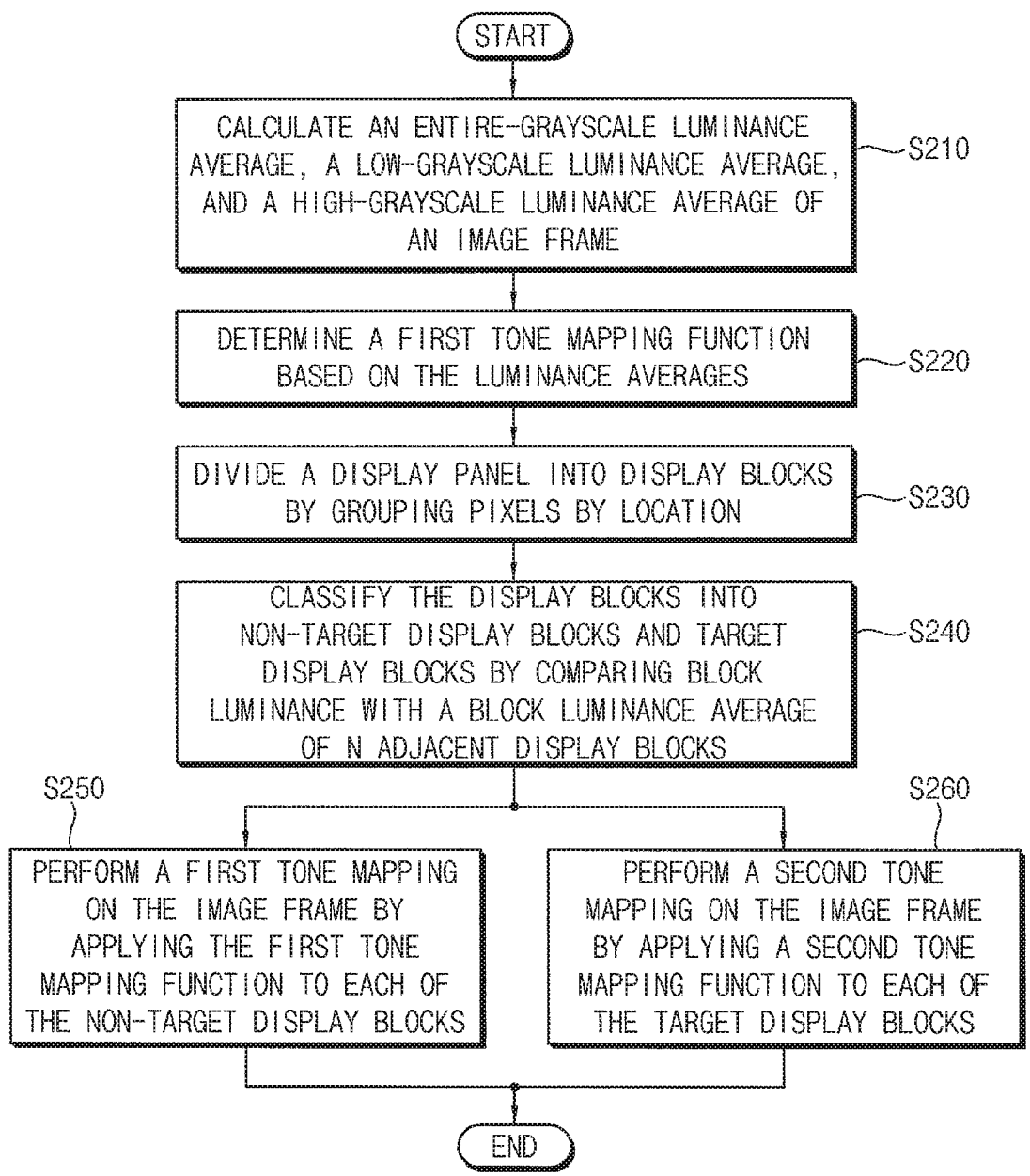
FIG. 5 is a flowchart illustrating a method of performing an image-adaptive tone mapping according to exemplary embodiments.
Figure 6:
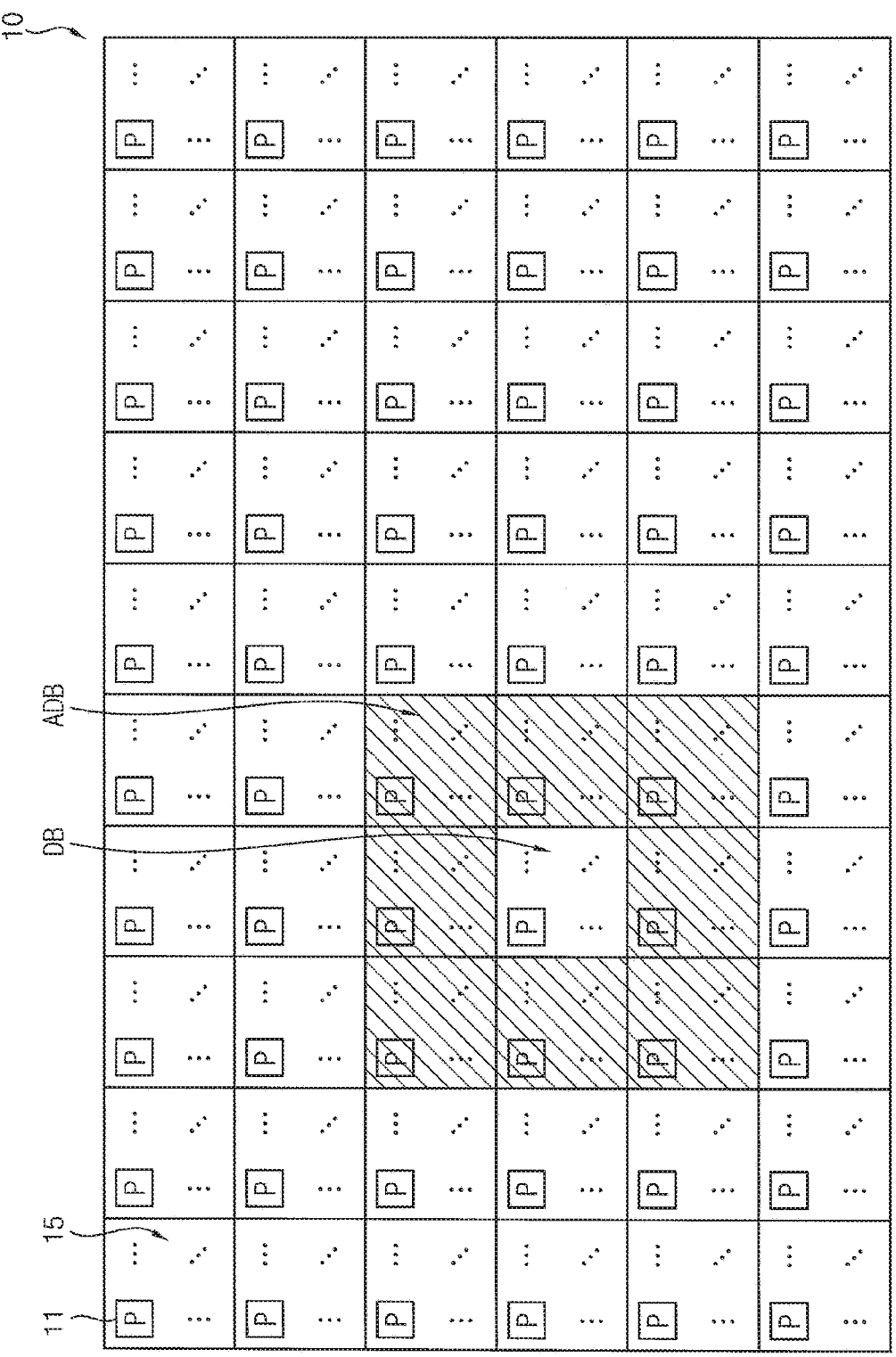
FIG. 6 is a diagram for describing the method of FIG. 5.
Figure 7:
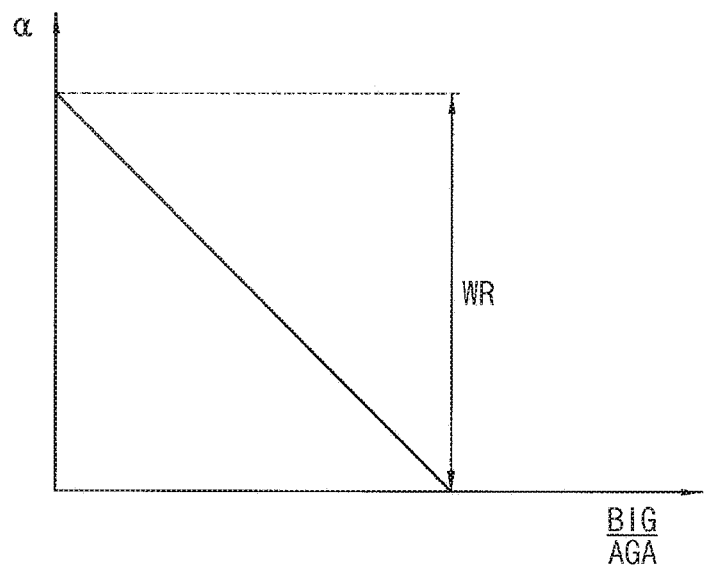
FIG. 7 is a graph illustrating a local weighted value which is calculated by the method of FIG. 5.

FIG. 5 is a flowchart illustrating a method of performing an image-adaptive tone mapping according to exemplary embodiments. FIG. 6 is a diagram for describing the method of FIG. 5. FIG. 7 is a graph illustrating a local weighted value, which is calculated by the method of FIG. 5.

Referring to FIGS. 5 to 7, the method of FIG. 5 calculates an entire-grayscale luminance average, a low-grayscale luminance average, and a high-grayscale luminance average of an image frame to be displayed on a display panel 10 by analyzing a data signal corresponding to the image frame (S210); determines a first tone mapping function GTM to be applied to the image frame based on the entire-grayscale luminance average, the low-grayscale luminance average, and the high-grayscale luminance average of the image frame (S220); divides the display panel 10 into a plurality of display blocks 15 by grouping a plurality of pixels 11 included in the display panel 10 by location (S230); classifies the display blocks 15 into non-target display blocks, of which block luminance BIG (i.e., luminance which each display block 15 is to implement in the image frame) is greater than a block luminance average AGA of N adjacent display blocks ADB, and target display blocks, of which the block luminance BIG is less than the block luminance average AGA of the N adjacent display blocks ADB (S240); performs a first tone mapping on the image frame by applying the first tone mapping function GTM to each of the non-target display blocks (S250); and performs a second tone mapping on the image frame by applying a second tone mapping function $(1+\alpha) \times$ GTM to each of the target display blocks (S260), where the second tone mapping function (1+α)×GTM is obtained by applying a local weighted value α to the first tone mapping function GTM. The method of FIG. 5 may perform the steps S210, S220, S230, S240, S250, and S260 for respective image frames to be displayed on the display panel 10.

Specifically, the method of FIG. 5 may calculate the entire-grayscale luminance average, the low-grayscale luminance average, and the high-grayscale luminance average of the image frame by analyzing the data signal corresponding to the image frame to be displayed on the display panel 10 (S210). In an exemplary embodiment, the data signal corresponding to the image frame to be displayed on the display panel 10 may be an RGB signal. In this case, the method of FIG. 5 may calculate the entire-grayscale luminance average, the low-grayscale luminance average, and the high-grayscale luminance average of the image frame based on a luminance signal, which is extracted from the data signal. Specifically, the method of FIG. 5 may convert the data signal (i.e., the RGB signal) corresponding to the image frame to be displayed on the display panel 10 into an YCbCr signal and may calculate the entire-grayscale luminance average, the low-grayscale luminance average, and the high-grayscale luminance average of the image frame based on the luminance signal (i.e., a Y signal) of the YCbCr signal. In an exemplary embodiment, the method of FIG. 5 may calculate the entire-grayscale luminance average of the image frame as an average of pixel luminance (i.e., luminance which each pixel 11 is to implement in the image frame) of all pixels 11 included in the display panel 10. Here, the method of FIG. 5 may classify the pixels 11 included in the display panel 10 into high-grayscale luminance pixels, of which the pixel luminance is greater than the entire-grayscale luminance average of the image frame and low-grayscale luminance pixels, of which the pixel luminance is less than the entire-grayscale luminance average of the image frame. In an exemplary embodiment, the method of FIG. 5 may determine the pixels 11, of which the pixel luminance is equal to the entire-grayscale luminance average of the image frame as the high-grayscale luminance pixels or the low-grayscale luminance pixels according to given requirements. In an exemplary embodiment, the method of FIG. 5 may calculate the low-grayscale luminance average of the image frame as an average of the pixel luminance of the low-grayscale luminance pixels among the pixels 11 included in the display panel 10 and may calculate the high-grayscale luminance average of the image frame as an average of the pixel luminance of the high-grayscale luminance pixels among the pixels 11 included in the display panel 10.

Subsequently, the method of FIG. 5 may determine the first tone mapping function GTM to be applied to the image frame based on the entire-grayscale luminance average, the low-grayscale luminance average, and the high-grayscale luminance average of the image frame (S220). As described above, the method of FIG. 5 may calculate the entire-grayscale luminance average, the low-grayscale luminance average, and the high-grayscale luminance average of the image frame based on the luminance signal (i.e., the Y signal) which is extracted from the data signal (i.e., the RGB signal) corresponding to the image frame to be displayed on the display panel 10. Specifically, the method of FIG. 5 may convert the data signal (i.e., the RGB signal) corresponding to the image frame to be displayed on the display panel 10 into the YCbCr signal and may calculate the entire-grayscale luminance average, the low-grayscale luminance average, and the high-grayscale luminance average of the image frame based on the luminance signal (i.e., the Y signal) of the YCbCr signal. In this case, the method of FIG. 5 may determine the first tone mapping function GTM to be applied to the image frame based on the entire-grayscale luminance average, the low-grayscale luminance average, and the high-grayscale luminance average of the image frame. Since these are described above with reference to FIGS. 3A and 3B, duplicate descriptions related thereto will not be repeated.

The method of FIG. 5 may divide the display panel 10 into the display blocks 15 by grouping the pixels 11 included in the display panel 10 by location (S230). Thus, as illustrated in FIG. 6, the display panel 10 may include one or more display blocks 15, and each of the display blocks 15 may include one or more pixels 11. For convenience of description, although it is described above that the step S230 is performed after the steps S210 and S220, it should be understood that the step S230 can be performed prior to the steps S210 and S220. In an exemplary embodiment, a size and a shape of the display block 15 formed by grouping the pixels 11 of the display panel 10 by location may be fixed. In this case, the method of FIG. 5 may divide the display panel 10 into the display blocks 15 in the same size and in the same shape for respective image frames. In another exemplary embodiment, the size and/or the shape of the display block 15 formed by grouping the pixels 11 of the display panel 10 by location may be changed. In this case, the method of FIG. 5 may divide the display panel 10 into the display blocks 15 in a different size and/or in a different shape for respective image frames or according to given requirements. When the display panel 10 is divided into the display blocks 15, the method of FIG. 5 may calculate the block luminance BIG of each display block 15. In an exemplary embodiment, the method of FIG. 5 may calculate the block luminance BIG of each display block 15 as an average of the pixel luminance of the pixels 11 included in each display block 15. In another exemplary embodiment, the method of FIG. 5 may calculate the block luminance BIG of each display block 15 as a weighted average of the pixel luminance of the pixels 11 included in each display block 15. In still another exemplary embodiment, the method of FIG. 5 may determine the block luminance BIG of each display block 15 as a minimum grayscale among grayscales corresponding to the pixel luminance of the pixels 11 included in each display block 15.

Next, the method of FIG. 5 may classify the display blocks 15 into the non-target display blocks, of which the block luminance BIG is greater than the block luminance average AGA of the N adjacent display blocks ADB, and the target display blocks, of which the block luminance BIG is less than the block luminance average AGA of the N adjacent display blocks ADB (S240). In other words, the display blocks 15, of which the block luminance BIG is greater than the block luminance average AGA of the N adjacent display blocks ADB may be determined as the non-target display blocks, and the display blocks 15, of which the block luminance BIG is less than the block luminance average AGA of the N adjacent display blocks ADB may be determined as the target display blocks. In exemplary embodiments, the method of FIG. 5 may determine the display blocks 15, of which the block luminance BIG is equal to the block luminance average AGA of the N adjacent display blocks ADB as the target display blocks or the non-target display blocks according to given requirements. In an exemplary embodiment, as illustrated in FIG. 6, when the block luminance average AGA of the N adjacent display blocks ADB is calculated, the N adjacent display blocks ADB may not include a display block DB to be classified. In this case, the block luminance BIG of the display block DB to be classified may be compared with the block luminance average AGA of the N adjacent display blocks ADB surrounding the display block DB to be classified. For example, as illustrated in FIG. 6, the display block DB to be classified may be surrounded by eight adjacent display blocks ADB, and the block luminance BIG of the display block DB to be classified may be compared with the block luminance average AGA of the eight adjacent display blocks ADB. In another exemplary embodiment, when the block luminance average AGA of the N adjacent display blocks ADB is calculated, the N adjacent display blocks ADB may include a display block DB to be classified. In this case, the block luminance BIG of the display block DB to be classified may be compared with the block luminance average AGA of the N adjacent display blocks ADB including the display block DB to be classified. For example, the block luminance average AGA of nine adjacent display blocks ADB (i.e., 3×3 display blocks 15) including the display block DB to be classified may be calculated, and the block luminance BIG of the display block DB to be classified may be compared with the block luminance average AGA of the nine adjacent display blocks ADB including the display block DB to be classified.

Subsequently, the method of FIG. 5 may perform the first tone mapping on the image frame by applying the first tone mapping function GTM to each of the non-target display blocks among the display blocks 15 (S250) and may perform the second tone mapping on the image frame by applying the second tone mapping function $(1+\alpha) \times GTM$ to each of the target display blocks among the display blocks 15 (S260), where the second tone mapping function $(1+\alpha) \times GTM$ is obtained by applying the local weighted value $\alpha$ to the first tone mapping function GTM. In an exemplary embodiment, the first tone mapping function GTM may be expressed by [Equation 1] above, and the second tone mapping function $(1+\alpha) \times GTM$ may be expressed by [Equation 2] above. As described above, for the pixels 11 included in the non-target display blocks among the display blocks 15, the method of FIG. 5 may perform only a so-called global tone mapping. On the other hand, for the pixels 11 included in the target display blocks among the display blocks 15, the method of FIG. 5 may perform the global tone mapping and may further perform a so-called local tone mapping to complement the global tone mapping. Specifically, for each of the non-target display blocks among the display blocks 15, the method of FIG. 5 may perform the first tone mapping on the image frame by outputting the first output luminance signal which is obtained by performing the first tone mapping on the luminance signal, which is extracted from the data signal, using the first tone mapping function GTM. In an exemplary embodiment, the method of FIG. 5 may convert the data signal (i.e., the RGB signal) into the YCbCr signal and may calculate the entire-grayscale luminance average, the low-grayscale luminance average, and the high-grayscale luminance average of the image frame based on the luminance signal (i.e., the Y signal) of the YCbCr signal. In this case, for each of the non-target display blocks among the display blocks 15, the method of FIG. 5 may generate the first output luminance signal (i.e., the Y' signal) based on the luminance signal (i.e., the Y signal) using the first tone mapping function GTM. Thus, the YCbCr signal may be converted into the Y'Cb'Cr' signal. Subsequently, for each of the non-target display blocks among the display blocks 15, the method of FIG. 5 may convert the Y'Cb'Cr' signal into the R'G'B' signal and then may display the image frame based on the R'G'B' signal. In this way, the method of FIG. 5 may perform the first tone mapping on the image frame for each of the non-target display blocks among the display blocks 15.

On the other hand, for each of the target display blocks among the display blocks 15, the method of FIG. 5 may perform the second tone mapping on the image frame by outputting the second output luminance signal which is obtained by performing the second tone mapping on the luminance signal, which is extracted from the data signal, using the second tone mapping function $(1+\alpha) \times GTM$. In an exemplary embodiment, the method of FIG. 5 may convert the data signal (i.e., the RGB signal) into the YCbCr signal and may calculate the entire-grayscale luminance average, the low-grayscale luminance average, and the high-grayscale luminance average of the image frame based on the luminance signal (i.e., the Y signal) of the YCbCr signal. In this case, for each of the target display blocks among the display blocks 15, the method of FIG. 5 may generate the second output luminance signal (i.e., the Y' signal) based on the luminance signal (i.e., the Y signal) using the second tone mapping function $(1+\alpha) \times GTM$. Thus, the YCbCr signal may be converted into the Y'Cb'Cr' signal. Subsequently, for each of the target display blocks among the display blocks 15, the method of FIG. 5 may convert the Y'Cb'Cr' signal into the R'G'B' signal and then may display the image frame based on the R'G'B' signal. In this way, the method of FIG. 5 may perform the second tone mapping on the image frame for each of the target display blocks among the display blocks 15. Here, as illustrated in FIG. 7, the local weighted value $\alpha$ which is applied to the first tone mapping function GTM to generate the second tone mapping function $(1+\alpha) \times GTM$ may decrease within a predetermined weighted value range WR as a luminance ratio which is calculated by dividing the block luminance BIG of each target display block by the block luminance average AGA of the N adjacent display blocks ADB increases. On the other hand, the local weighted value $\alpha$ which is applied to the first tone mapping function GTM to generate the second tone mapping function $(1+\alpha) \times GTM$ may increase within the predetermined weighted value range WR as the luminance ratio which is calculated by dividing the block luminance BIG of each target display block by the block luminance average AGA of the N adjacent display blocks ADB decreases. As described above, for each of the target display blocks among the display blocks 15, the method of FIG. 5 may further perform the simple local tone mapping to complement the global tone mapping by performing the second tone mapping on the image frame using the second tone mapping function $(1+\alpha) \times GTM$ which is obtained by applying the local weighted value $\alpha$ to the first tone mapping function GTM. Therefore, as compared to a conventional image-adaptive tone mapping method, the method of FIG. 5 may be easily implemented by hardware and may be performed in real-time because an amount of computation is relatively small.

In brief, the method of FIG. 5 may calculate the entire-grayscale luminance average, the low-grayscale luminance average, and the high-grayscale luminance average of the image frame by analyzing the data signal corresponding to the image frame to be displayed on the display panel 10, may determine the first tone mapping function GTM to be applied to the image frame based on the entire-grayscale luminance average, the low-grayscale luminance average, and the high-grayscale luminance average of the image frame, may divide the display panel 10 into the display blocks 15 by grouping the pixels 11 included in the display panel 10 by location, may classify the display blocks 15 into the non-target display blocks and the target display blocks based on the block luminance BIG of respective display blocks 15, may perform the first tone mapping on the image frame by applying the first tone mapping function GTM to each of the non-target display blocks among the display blocks 15, and may perform the second tone mapping on the image frame by applying the second tone mapping function $(1+\alpha) \times GTM$ to each of the target display blocks among the display blocks 15, where the second tone mapping function $(1+\alpha) \times GTM$ is obtained by applying the local weighted value $\alpha$ to the first tone mapping function GTM. Thus, the method of FIG. 5 may improve a contrast ratio of the image frame, may enhance expressive power of the low-grayscale region of the image frame (i.e., may properly reflect characteristics of the low-grayscale region of the image frame), and thus, may provide a high-quality image to a user. As described above, the method of FIG. 5 may improve a result (i.e., may output the second output luminance signal instead of the first output luminance signal in response to the luminance signal) by applying the local weighted value $\alpha$ to the first tone mapping function GTM (i.e., the global tone mapping function) when the block luminance BIG of the display block 15 is less than the block luminance average AGA of the N adjacent display blocks ADB. In other words, the method of FIG. 5 may reflect the block luminance BIG of the display block 15 (i.e., average luminance information of the display block 15) to perform the image-adaptive tone mapping. As a result, the method of FIG. 5 may enhance the expressive power of the low-grayscale region of the image frame as well as improve the contrast ratio of the image frame.

Figure 8:
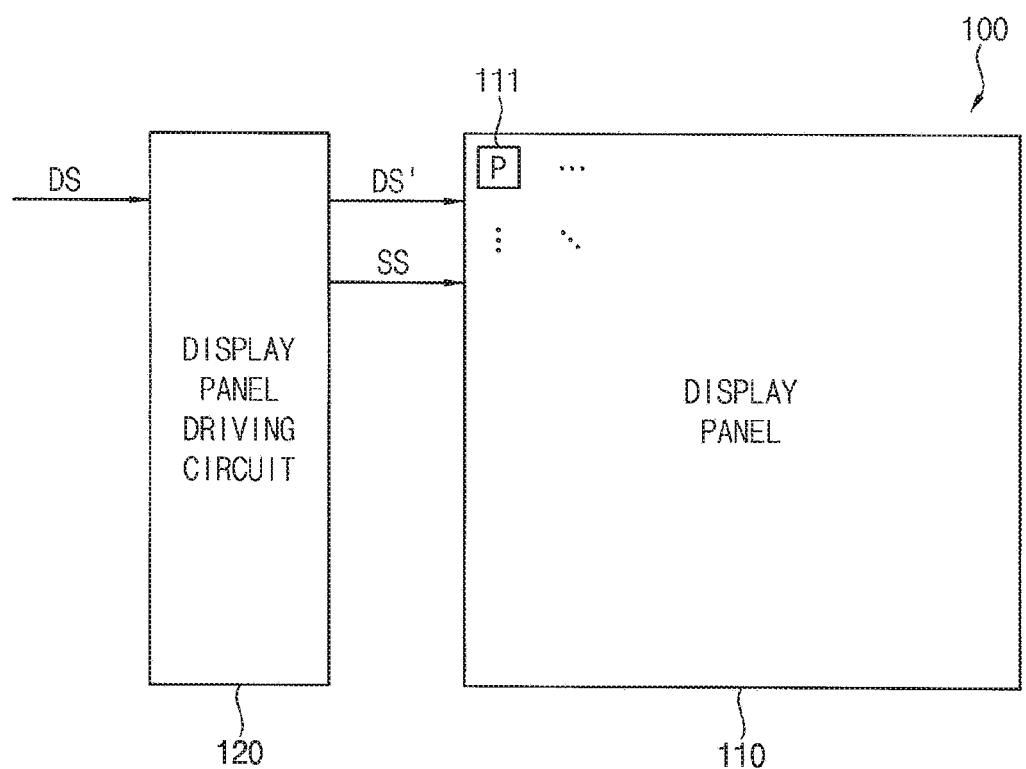
FIG. 8 is a block diagram illustrating a display device according to an exemplary embodiment.

FIG. 8 is a block diagram illustrating a display device according to an exemplary embodiment.

Referring to FIG. 8, the display device 100 may include a display panel 110 and a display panel driving circuit 120. In an exemplary embodiment, the display device 100 may be an organic light emitting display (OLED) device. In another exemplary embodiment, the display device 100 may be a liquid crystal display (LCD) device. However, the display device 100 of the inventive concepts is not limited thereto.

The display panel 110 may include a plurality of pixels 111. Here, the pixels 111 may be arranged in various forms (e.g., a matrix form, etc) in the display panel 110. The display panel driving circuit 120 may drive the display panel 110. In an exemplary embodiment, the display panel driving circuit 120 may include a scan driver, a data driver, and a timing controller. The display panel 110 may be connected to the scan driver via scan lines. The display panel 110 may be connected to the data driver via data lines. The scan driver may provide a scan signal SS to the pixels 111 included in the display panel 110 via the scan lines. The data driver may provide a tone-mapped data signal DS' to the pixels 111 included in the display panel 110 via the data lines. The timing controller may generate and provide a plurality of control signals to the scan driver, the data driver, etc to control the scan driver, the data driver, etc. In an exemplary embodiment, the timing controller may perform a given processing (e.g., a deterioration compensation processing, etc) on a data signal DS input from an external component. In an exemplary embodiment, when the display device 100 is the OLED device, the display panel driving circuit 120 may further include an emission control driver. In this case, the emission control driver may be connected to the display panel 110 via emission control-lines. The emission control driver may provide an emission control signal to the pixels 111 included in the display panel 110 via the emission control-lines. In an exemplary embodiment, when the display device 100 is the LCD device, the display device 100 may further include a backlight unit that radiates light to the display panel 110.

The display panel driving circuit 120 may enhance an image quality by improving a contrast ratio of an image frame by performing a tone mapping on respective image frames to be displayed on the display panel 110. For example, when the data signal DS corresponding to the image frame to be displayed on the display panel 110 is an RGB signal, the display panel driving circuit 120 may perform the tone mapping on the image frame by converting the RGB signal into an YCbCr signal, by converting the YCbCr signal into an Y'Cb'Cr' signal based on a first tone mapping function and a second tone mapping function, by converting the Y'Cb'Cr' signal into an R'G'B' signal, and by displaying the image frame based on the R'G'B' signal. To this end, the display panel driving circuit 120 may calculate an entire-grayscale luminance average, a low-grayscale luminance average, and a high-grayscale luminance average of an image frame to be displayed on the display panel 110 by analyzing the data signal DS corresponding to the image frame, may determine the first tone mapping function to be applied to the image frame based on the entire-grayscale luminance average, the low-grayscale luminance average, and the high-grayscale luminance average of the image frame, may divide the display panel 110 into display blocks by grouping the pixels 111 included in the display panel 110 by location, may classify the display blocks into non-target display blocks and target display blocks based on block luminance of respective display blocks, may perform a first tone mapping on the image frame by applying the first tone mapping function to each of the non-target display blocks, and may perform a second tone mapping on the image frame by applying the second tone mapping function to each of the target display blocks, where the second tone mapping function is obtained by applying a local weighted value to the first tone mapping function. Here, the first tone mapping function may be expressed by [Equation 1] above, and the second tone mapping function may be expressed by [Equation 2] above.

In an exemplary embodiment, the display panel driving circuit 120 may classify the display blocks into the non-target display blocks, of which the block luminance is greater than the low-grayscale luminance average of the image frame and the target display blocks, of which the block luminance is less than the low-grayscale luminance average of the image frame. Specifically, the display panel driving circuit 120 may calculate the entire-grayscale luminance average, the low-grayscale luminance average, and the high-grayscale luminance average of the image frame by analyzing the data signal DS corresponding to the image frame to be displayed on the display panel 110, may determine the first tone mapping function to be applied to the image frame based on the entire-grayscale luminance average, the low-grayscale luminance average, and the high-grayscale luminance average of the image frame, may divide the display panel 110 into the display blocks by grouping the pixels 111 included in the display panel 110 by location, may classify the display blocks into the non-target display blocks, of which the block luminance is greater than the low-grayscale luminance average and the target display blocks, of which the block luminance is less than the low-grayscale luminance average, may perform the first tone mapping on the image frame by applying the first tone mapping function to each of the non-target display blocks, and may perform the second tone mapping on the image frame by applying the second tone mapping function to each of the target display blocks, where the second tone mapping function is obtained by applying the local weighted value to the first tone mapping function. As described above, for each of the non-target display blocks among the display blocks, the display panel driving circuit 120 may convert the YCbCr signal into the Y'Cb'Cr' signal by generating the first output luminance signal (i.e., Y' signal) based on the luminance signal (i.e., Y signal) using the first tone mapping function, may convert the Y'Cb'Cr' signal into the R'G'B' signal, and then may display the image frame based on the R'G'B' signal. That is, for each of the non-target display blocks among the display blocks, the display panel driving circuit 120 may perform the first tone mapping on the image frame. On the other hand, for each of the target display blocks among the display blocks, the display panel driving circuit 120 may convert the YCbCr signal into the Y'Cb'Cr' signal by generating the second output luminance signal (i.e., Y' signal) based on the luminance signal (i.e., Y signal) using the second tone mapping function, may convert the Y'Cb'Cr' signal into the R'G'B' signal, and then may display the image frame based on the R'G'B' signal. That is, for each of the target display blocks among the display blocks, the display panel driving circuit 120 may perform the second tone mapping on the image frame.

In another exemplary embodiment, the display panel driving circuit 120 may classify the display blocks into the non-target display blocks, of which the block luminance is greater than a block luminance average of N adjacent display blocks, and the target display blocks, of which the block luminance is less than the block luminance average of the N adjacent display blocks. Specifically, the display panel driving circuit 120 may calculate the entire-grayscale luminance average, the low-grayscale luminance average, and the high-grayscale luminance average of the image frame by analyzing the data signal DS corresponding to the image frame to be displayed on the display panel 110, may determine the first tone mapping function to be applied to the image frame based on the entire-grayscale luminance average, the low-grayscale luminance average, and the high-grayscale luminance average of the image frame, may divide the display panel 110 into the display blocks by grouping the pixels 111 included in the display panel 110 by location, may classify the display blocks into the non-target display blocks, of which the block luminance is greater than the block luminance average of the N adjacent display blocks and the target display blocks, of which the block luminance is less than the block luminance average of the N adjacent display blocks, where the N adjacent display blocks may or may not include a display block to be classified, may perform the first tone mapping on the image frame by applying the first tone mapping function to each of the non-target display blocks, and may perform the second tone mapping on the image frame by applying the second tone mapping function to each of the target display blocks, where the second tone mapping function is obtained by applying the local weighted value to the first tone mapping function. As described above, for each of the non-target display blocks among the display blocks, the display panel driving circuit 120 may convert the YCbCr signal into the Y'Cb'Cr' signal by generating the first output luminance signal (i.e., Y' signal) based on the luminance signal (i.e., Y signal) using the first tone mapping function, may convert the Y'Cb'Cr' signal into the R'G'B' signal, and then may display the image frame based on the R'G'B' signal. That is, for each of the non-target display blocks among the display blocks, the display panel driving circuit 120 may perform the first tone mapping on the image frame. On the other hand, for each of the target display blocks among the display blocks, the display panel driving circuit 120 may convert the YCbCr signal into the Y'Cb'Cr' signal by generating the second output luminance signal (i.e., Y' signal) based on the luminance signal (i.e., Y signal) using the second tone mapping function, may convert the Y'Cb'Cr' signal into the R'G'B' signal, and then may display the image frame based on the R'G'B' signal. That is, for each of the target display blocks among the display blocks, the display panel driving circuit 120 may perform the second tone mapping on the image frame.

As described above, for the pixels 111 included in the non-target display blocks among the display blocks of the display panel 110, the display panel driving circuit 120 may perform only a so-called global tone mapping. On the other hand, for the pixels 111 included in the target display blocks among the display blocks of the display panel 110, the display panel driving circuit 120 may perform the global tone mapping and may further perform a so-called local tone mapping to complement the global tone mapping. In brief, the display device 100 may perform the local tone mapping which complements the global tone mapping in a simple way by calculating the entire-grayscale luminance average, the low-grayscale luminance average, and the high-grayscale luminance average of the image frame by analyzing the data signal DS corresponding to the image frame to be displayed on the display panel 110, by determining the first tone mapping function to be applied to the image frame based on the entire-grayscale luminance average, the low-grayscale luminance average, and the high-grayscale luminance average of the image frame, by dividing the display panel 110 into display blocks by grouping the pixels 111 included in the display panel 110 by location, by classifying the display blocks into the non-target display blocks and the target display blocks based on the block luminance of respective display blocks, by performing the first tone mapping on the image frame by applying the first tone mapping function to each of the non-target display blocks, and by performing the second tone mapping on the image frame by applying the second tone mapping function to each of the target display blocks, where the second tone mapping function is obtained by applying the local weighted value to the first tone mapping function. Thus, the display device 100 may perform an image-adaptive tone mapping in real-time while easily implementing the image-adaptive tone mapping. As a result, the display device 100 may improve a contrast ratio of the image frame, may enhance expressive power of the low-grayscale region of the image frame (i.e., may properly reflect characteristics of the low-grayscale region of the image frame), and thus may provide a high-quality image to a user. Although it is described above that the display device 100 includes the display panel 110 and the display panel driving circuit 120, in an exemplary embodiment, the display device 100 may further include other components (e.g., a deterioration compensation circuit for performing deterioration compensation on the pixels 111 included in the display panel 110, etc).

Figure 9:
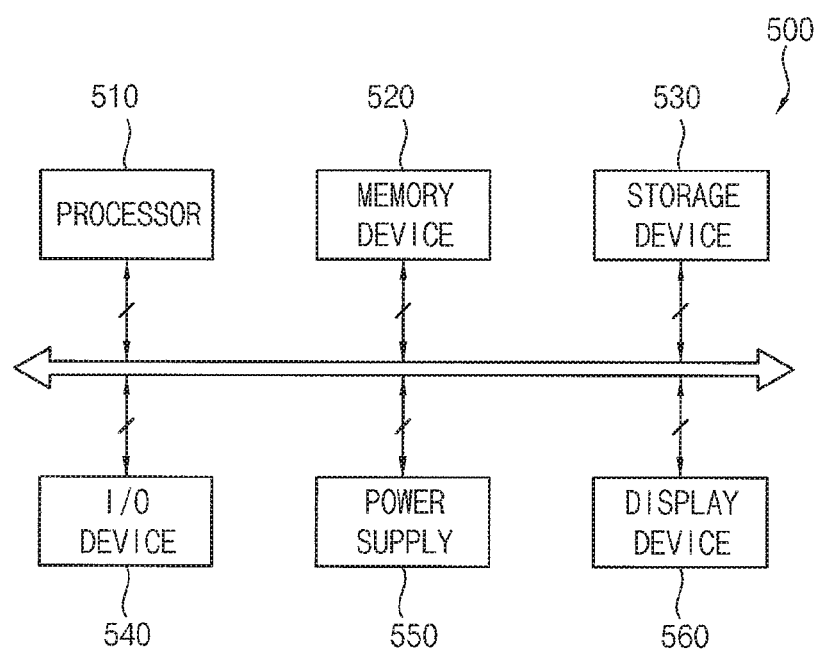
FIG. 9 is a block diagram illustrating an electronic device according to an exemplary embodiment.
Figure 10A:
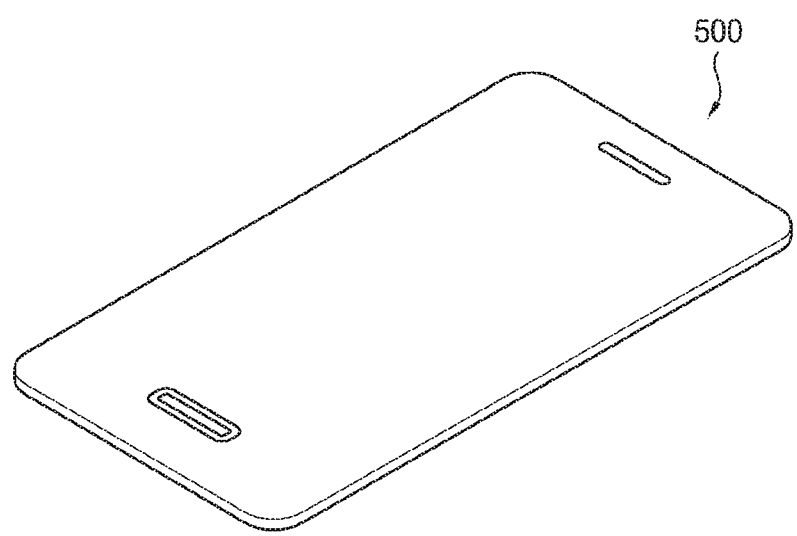
FIG. 10A is a perspective view illustrating an example in which the electronic device of FIG. 9 is implemented as a smart phone.
Figure 10B:
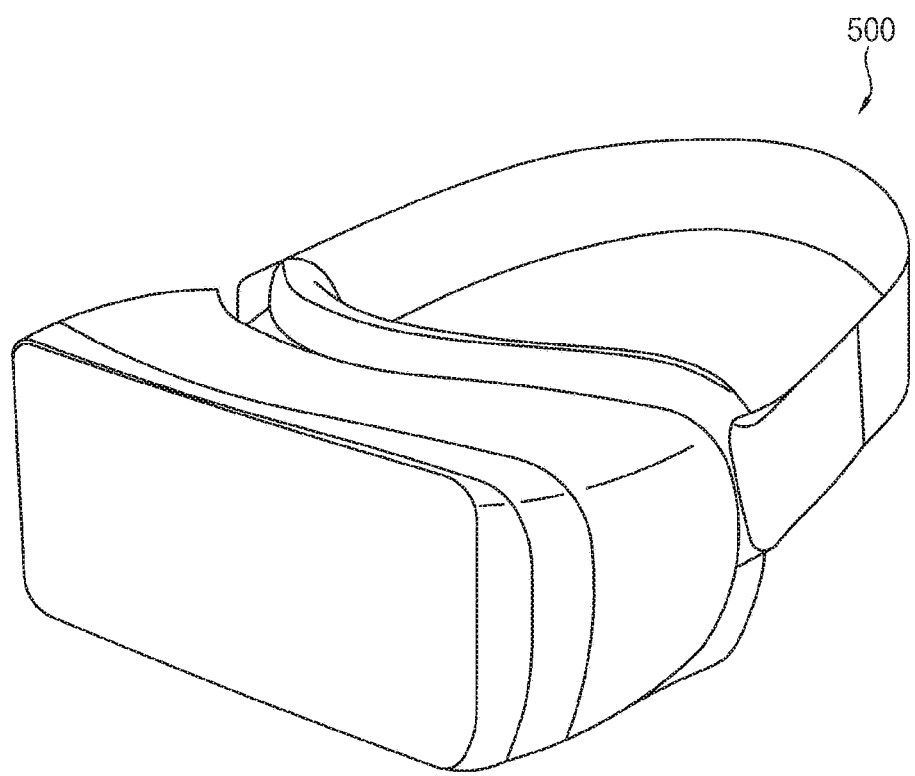
FIG. 10B is a perspective view illustrating an example in which the electronic device of FIG. 9 is implemented as a head mounted display (HMD) device.

FIG. 9 is a block diagram illustrating an electronic device according to exemplary embodiments. FIG. 10A is a perspective view illustrating an example in which the electronic device of FIG. 9 is implemented as a smart phone. FIG. 10B is a perspective view illustrating an example in which the electronic device of FIG. 9 is implemented as a head mounted display (HMD) device.

Referring to FIGS. 9 to 10B, the electronic device 500 may include a processor 510, a memory device 520, a storage device 530, an input/output (I/O) device 540, a power supply 550, and a display device 560. Here, the display device 560 may be the display device 100 of FIG. 8. In addition, the electronic device 500 may further include a plurality of ports for communicating with a video card, a sound card, a memory card, a universal serial bus (USB) device, other electronic devices, etc. In an exemplary embodiment, as illustrated in FIG. 10A, the electronic device 500 may be implemented as a smart phone. In another exemplary embodiment, as illustrated in FIG. 10B, the electronic device 500 may be implemented as an HMD device. However, the electronic device 500 is not limited thereto. For example, the electronic device 500 may be implemented as a television, a cellular phone, a video phone, a smart pad, a smart watch, a tablet PC, a car navigation system, a computer monitor, a laptop, etc.

The processor 510 may perform various computing functions. The processor 510 may be a micro processor, a central processing unit (CPU), an application processor (AP), etc. The processor 510 may be coupled to other components via an address bus, a control bus, a data bus, etc. Further, the processor 510 may be coupled to an extended bus, such as a peripheral component interconnection (PCI) bus. The memory device 520 may store data for operations of the electronic device 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 530 may include a solid state drive (SSD) device, a hard disk drive (HDD) device, a CD-ROM device, etc. The I/O device 540 may include an input device such as a keyboard, a keypad, a mouse device, a touchpad, a touch-screen, etc, and an output device such as a printer, a speaker, etc. In an exemplary embodiment, the display device 560 may be included in the I/O device 540. The power supply 550 may provide power for operations of the electronic device 500.

The display device 560 may be coupled to other components via buses or other communication links. In an exemplary embodiment, the display device 560 may be an OLED device. In another exemplary embodiment, the display device 560 may be an LCD device. However, the display device 560 is not limited thereto. As described above, the display device 560 may perform an image-adaptive tone mapping in real-time while easily implementing the image-adaptive tone mapping. Thus, the display device 560 may improve a contrast ratio of an image frame, may enhance expressive power of a low-grayscale region of the image frame, and thus may provide a high-quality image to a user. To this end, the display device 560 includes a display panel and a display panel driving circuit for driving the display panel. The display panel includes a plurality of pixels. Specifically, the display panel driving circuit calculates an entire-grayscale luminance average, a low-grayscale luminance average, and a high-grayscale luminance average of an image frame to be displayed on the display panel by analyzing a data signal corresponding to the image frame; determines a first tone mapping function to be applied to the image frame based on the entire-grayscale luminance average, the low-grayscale luminance average, and the high-grayscale luminance average of the image frame; divides the display panel into display blocks by grouping the pixels included in the display panel by location; classifies the display blocks into non-target display blocks and target display blocks based on block luminance of respective display blocks; performs a first tone mapping on the image frame by applying the first tone mapping function to each of the non-target display blocks; and performs a second tone mapping on the image frame by applying a second tone mapping function to each of the target display blocks, where the second tone mapping function is obtained by applying a local weighted value to the first tone mapping function. Here, the first tone mapping function (i.e., a global tone mapping function) may be expressed by [Equation 1] above, and the second tone mapping function (i.e., a tone mapping function which is obtained by applying the local weighted value to the global tone mapping function) may be expressed by [Equation 2] above. In an exemplary embodiment, the display panel driving circuit may classify the display blocks into the non-target display blocks, of which the block luminance is greater than the low-grayscale luminance average of the image frame and the target display blocks, of which the block luminance is less than the low-grayscale luminance average of the image frame. In another exemplary embodiment, the display panel driving circuit may classify the display blocks into the non-target display blocks, of which the block luminance is greater than a block luminance average of N adjacent display blocks and the target display blocks, of which the block luminance is less than the block luminance average of the N adjacent display blocks, where the N adjacent display blocks may or may not include a display block to be classified. Since the display device 560 is described above, duplicated description related thereto will not be repeated.

Therefore, a method of performing an image-adaptive tone mapping according to exemplary embodiments may perform a local tone mapping which complements a global tone mapping in a simple way by calculating an entire-grayscale luminance average, a low-grayscale luminance average, and a high-grayscale luminance average of an image frame to be displayed on a display panel by analyzing a data signal corresponding to the image frame, by determining a first tone mapping function to be applied to the image frame based on the entire-grayscale luminance average, the low-grayscale luminance average, and the high-grayscale luminance average of the image frame, by dividing the display panel into display blocks by grouping pixels included in the display panel by location, by classifying the display blocks into non-target display blocks and target display blocks based on block luminance of respective display blocks, by performing a first tone mapping on the image frame by applying the first tone mapping function to each of the non-target display blocks, and by performing a second tone mapping on the image frame by applying a second tone mapping function to each of the target display blocks, where the second tone mapping function is obtained by applying a local weighted value to the first tone mapping function. Thus, the method of performing the image-adaptive tone mapping may improve a contrast ratio of the image frame, may enhance expressive power of a low-grayscale region of the image frame (i.e., may properly reflect characteristics of the low-grayscale region of the image frame), and thus may provide a high-quality image to a user (or viewer).

In addition, a display device employing the method of performing the image-adaptive tone mapping according to exemplary embodiments may perform an image-adaptive tone mapping in real-time while easily implementing the image-adaptive tone mapping. Thus, the display device may improve a contrast ratio of the image frame, may enhance expressive power of the low-grayscale region of the image frame, and thus, may provide a high-quality image to a user.

The present inventive concept may be applied to a display device, and an electronic device including the display device. For example, the present inventive concept may be applied to a cellular phone, a smart phone, a video phone, a smart pad, a smart watch, a tablet PC, a car navigation system, a television, a computer monitor, a laptop, a digital camera, an HMD device, etc.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of performing an image-adaptive tone mapping, the method comprising:
calculating an entire-grayscale luminance average, a low-grayscale luminance average, and a high-grayscale luminance average of an image frame to be displayed on a display panel by analyzing a data signal corresponding to the image frame;
determining a first tone mapping function to be applied to the image frame based on the entire-grayscale luminance average, the low-grayscale luminance average, and the high-grayscale luminance average;
dividing the display panel into a plurality of display blocks by grouping a plurality of pixels included in the display panel by location;
classifying the display blocks into non-target display blocks, of which block luminance is greater than the low-grayscale luminance average, and target display blocks, of which the block luminance is less than the low-grayscale luminance average;
performing a first tone mapping on the image frame by applying the first tone mapping function to each of the non-target display blocks; and
performing a second tone mapping on the image frame by applying a second tone mapping function to each of the target display blocks, the second tone mapping function being obtained by applying a local weighted value to the first tone mapping function.

2. The method of claim 1, wherein the first tone mapping function is expressed by [Equation 1] below:

$$\text{OUTPUT1}=\text{GTM}(\text{INPUT}), \qquad [\text{Equation 1}]$$

where GTM denotes the first tone mapping function, INPUT denotes a luminance signal which is extracted from the data signal, and OUTPUT1 denotes a first output luminance signal which is obtained by performing the first tone mapping on the luminance signal.

3. The method of claim 2, wherein the second tone mapping function is expressed by [Equation 2] below:

$$\text{OUTPUT2}=(1+\alpha)\times\text{GTM}(\text{INPUT}), \qquad [\text{Equation 2}]$$

where GTM denotes the first tone mapping function, INPUT denotes the luminance signal which is extracted from the data signal, α denotes the local weighted value, and OUTPUT2 denotes a second output luminance signal which is obtained by performing the second tone mapping on the luminance signal.

4. The method of claim 3, wherein:
the local weighted value decreases within a predetermined weighted value range as a luminance ratio, which is calculated by dividing the block luminance of the each of the target display blocks by the low-grayscale luminance average, increases; and
the local weighted value increases within the predetermined weighted value range as the luminance ratio decreases.

5. The method of claim 1, wherein:
the pixels are classified into high-grayscale luminance pixels, of which pixel luminance is greater than the entire-grayscale luminance average, and low-grayscale luminance pixels, of which the pixel luminance is less than the entire-grayscale luminance average; and
the entire-grayscale luminance average is calculated as an average of the pixel luminance of all of the pixels, the low-grayscale luminance average is calculated as an average of the pixel luminance of the low-grayscale luminance pixels, and the high-grayscale luminance average is calculated as an average of the pixel luminance of the high-grayscale luminance pixels.

6. The method of claim 5, wherein the block luminance is calculated as an average of the pixel luminance of the pixels included in each of the display blocks.

7. The method of claim 5, wherein the block luminance is calculated as a weighted average of the pixel luminance of the pixels included in each of the display blocks.

8. The method of claim 5, wherein the block luminance is determined as a minimum grayscale among grayscales corresponding to the pixel luminance of the pixels included in each of the display blocks.

9. A method of performing an image-adaptive tone mapping, the method comprising:
calculating an entire-grayscale luminance average, a low-grayscale luminance average, and a high-grayscale luminance average of an image frame to be displayed on a display panel by analyzing a data signal corresponding to the image frame;
determining a first tone mapping function to be applied to the image frame based on the entire-grayscale luminance average, the low-grayscale luminance average, and the high-grayscale luminance average;
dividing the display panel into a plurality of display blocks by grouping a plurality of pixels included in the display panel by location;
classifying the display blocks into non-target display blocks, of which block luminance is greater than a block luminance average of N adjacent display blocks, where N is an integer greater than or equal to 8, and target display blocks, of which the block luminance is less than the block luminance average;
performing a first tone mapping on the image frame by applying the first tone mapping function to each of the non-target display blocks; and
performing a second tone mapping on the image frame by applying a second tone mapping function to each of the target display blocks, the second tone mapping function being obtained by applying a local weighted value to the first tone mapping function.

10. The method of claim 9, wherein the first tone mapping function is expressed by [Equation 1] below:

$$\text{OUTPUT1}=\text{GTM}(\text{INPUT}), \qquad [\text{Equation 1}]$$

where GTM denotes the first tone mapping function, INPUT denotes a luminance signal which is extracted from the data signal, and OUTPUT1 denotes a first output luminance signal which is obtained by performing the first tone mapping on the luminance signal.

11. The method of claim 10, wherein the second tone mapping function is expressed by [Equation 2] below:

$$\text{OUTPUT2}=(1+\alpha)\times\text{GTM}(\text{INPUT}), \quad \text{[Equation 2]}$$

where GTM denotes the first tone mapping function, INPUT denotes the luminance signal which is extracted from the data signal, a denotes the local weighted value, and OUTPUT2 denotes a second output luminance signal which is obtained by performing the second tone mapping on the luminance signal.

12. The method of claim 11, wherein:
the local weighted value decreases within a predetermined weighted value range as a luminance ratio which is calculated by dividing the block luminance of the each of the target display blocks by the block luminance average of the N adjacent display blocks increases; and
the local weighted value increases within the predetermined weighted value range as the luminance ratio decreases.

13. The method of claim 9, wherein:
the pixels are classified into high-grayscale luminance pixels, of which pixel luminance is greater than the entire-grayscale luminance average, and low-grayscale luminance pixels, of which the pixel luminance is less than the entire-grayscale luminance average; and
the entire-grayscale luminance average is calculated as an average of the pixel luminance of all of the pixels, the low-grayscale luminance average is calculated as an average of the pixel luminance of the low-grayscale luminance pixels, and the high-grayscale luminance average is calculated as an average of the pixel luminance of the high-grayscale luminance pixels.

14. The method of claim 13, wherein the block luminance is calculated as an average of the pixel luminance of the pixels included in each of the display blocks.

15. The method of claim 13, wherein the block luminance is calculated as a weighted average of the pixel luminance of the pixels included in each of the display blocks.

16. The method of claim 13, wherein the block luminance is determined as a minimum grayscale among grayscales corresponding to the pixel luminance of the pixels included in each of the display blocks.

17. A display device, comprising:
a display panel comprising a plurality of pixels; and
a display panel driving circuit configured to drive the display panel,
wherein the display panel driving circuit calculates an entire-grayscale luminance average, a low-grayscale luminance average, and a high-grayscale luminance average of an image frame to be displayed on the display panel by analyzing a data signal corresponding to the image frame, determines a first tone mapping function to be applied to the image frame based on the entire-grayscale luminance average, the low-grayscale luminance average, and the high-grayscale luminance average, divides the display panel into a plurality of display blocks by grouping the pixels by location, classifies the display blocks into non-target display blocks and target display blocks based on block luminance of each of the display blocks, performs a first tone mapping on the image frame by applying the first tone mapping function to each of the non-target display blocks, and performs a second tone mapping on the image frame by applying a second tone mapping function to each of the target display blocks, the second tone mapping function being obtained by applying a local weighted value to the first tone mapping function.

18. The display device of claim 17, wherein the display panel driving circuit classifies the display blocks into the non-target display blocks, of which the block luminance is greater than the low-grayscale luminance average, and the target display blocks, of which the block luminance is less than the low-grayscale luminance average.

19. The display device of claim 17, wherein the display panel driving circuit classifies the display blocks into the non-target display blocks, of which the block luminance is greater than a block luminance average of N adjacent display blocks, where N is an integer greater than or equal to 8, and the target display blocks, of which the block luminance is less than the block luminance average.

20. The display device of claim 17, wherein the first tone mapping function is expressed by [Equation 1] below:

$$\text{OUTPUT1}=\text{GTM}(\text{INPUT}), \quad \text{[Equation 1]}$$

where GTM denotes the first tone mapping function, INPUT denotes a luminance signal which is extracted from the data signal, and OUTPUT1 denotes a first output luminance signal which is obtained by performing the first tone mapping on the luminance signal, and wherein the second tone mapping function is expressed by [Equation 2] below:

$$\text{OUTPUT2}=(1+\alpha)\times\text{GTM}(\text{INPUT}), \quad \text{[Equation 2]}$$

where GTM denotes the first tone mapping function, INPUT denotes the luminance signal which is extracted from the data signal, a denotes the local weighted value, and OUTPUT2 denotes a second output luminance signal which is obtained by performing the second tone mapping on the luminance signal.

* * * * *